United States Patent
Borcherding

(10) Patent No.: US 7,171,731 B1
(45) Date of Patent: Feb. 6, 2007

(54) FASTENER WITH SELF-ORGANIZING DEVICE FOR STORAGE

(76) Inventor: Paul R. Borcherding, 809 Indie Ct., Frazier Park, CA (US) 93225

( * ) Notice: Subject to any disclaimer, the term of this patent is extended or adjusted under 35 U.S.C. 154(b) by 0 days.

(21) Appl. No.: 11/447,624

(22) Filed: Jun. 6, 2006

(51) Int. Cl.
*A44B 21/00* (2006.01)

(52) U.S. Cl. .............................. 24/302; 24/288; 24/298; 24/68 CD; 24/265 CD; 24/71 TD

(58) Field of Classification Search ............... 24/68 E, 24/71 TD, 68 CT, 68 CD, 265 H, 369, 165, 24/182, 192, 242; 254/217
See application file for complete search history.

(56) References Cited

U.S. PATENT DOCUMENTS

| | | | |
|---|---|---|---|
| 2,429,926 A | 10/1947 | Davis | |
| 2,442,266 A | 5/1948 | Davis | |
| 3,377,044 A | 4/1968 | Jackson et al. | |
| 3,927,445 A | 12/1975 | Pavlish | |
| 4,280,258 A | 7/1981 | Kunze | |
| 4,862,563 A | 9/1989 | Flynn | |
| 4,991,640 A | 2/1991 | Verkindt et al. | |
| 5,008,987 A * | 4/1991 | Armour, II ................. | 24/442 |
| D319,382 S | 8/1991 | Hunter | |
| 5,130,899 A | 7/1992 | Larkin et al. | |
| 5,289,619 A | 3/1994 | Pileggi | |
| D351,336 S | 10/1994 | Dean et al. | |
| 5,535,928 A | 7/1996 | Herring | |
| 5,548,871 A | 8/1996 | Trethewey | |
| 5,604,961 A | 2/1997 | Cole | |
| 5,761,774 A | 6/1998 | Champi | |
| 5,809,620 A * | 9/1998 | Crowley et al. ............. | 24/302 |
| 5,868,369 A | 2/1999 | Montgomery | |
| 6,049,953 A | 4/2000 | McCay et al. | |
| 6,416,265 B1 | 7/2002 | Flores et al. | |
| 6,430,784 B1 | 8/2002 | Dudek et al. | |
| 6,637,077 B2 * | 10/2003 | Doty ........................... | 24/302 |
| 6,648,381 B2 * | 11/2003 | Holton et al. ................ | 292/288 |
| 6,775,896 B2 | 8/2004 | Dudek et al. | |

* cited by examiner

*Primary Examiner*—Robert J. Sandy
*Assistant Examiner*—Marcus Menezes
(74) *Attorney, Agent, or Firm*—Peter Ganjian

(57) ABSTRACT

The present invention provides a tie-down strap that may be used more or less universally for securing cargo of various kinds under varying conditions, and further includes a self-organizing mechanism that is simple, practical, and easy to use for storage and re-use of the tie-down strap.

6 Claims, 6 Drawing Sheets

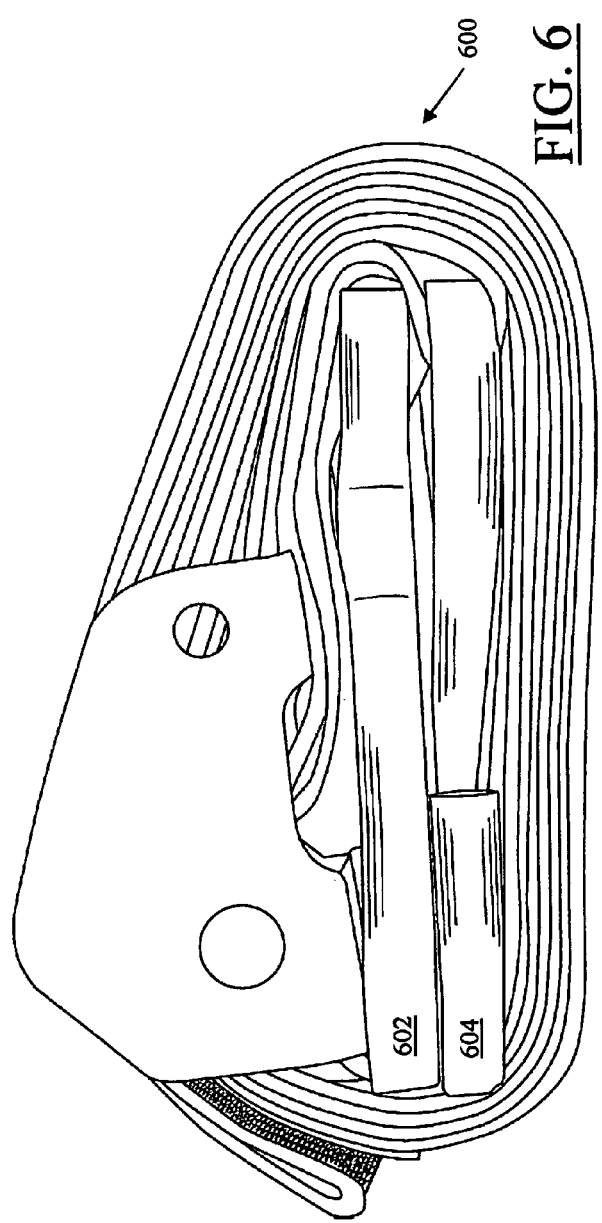
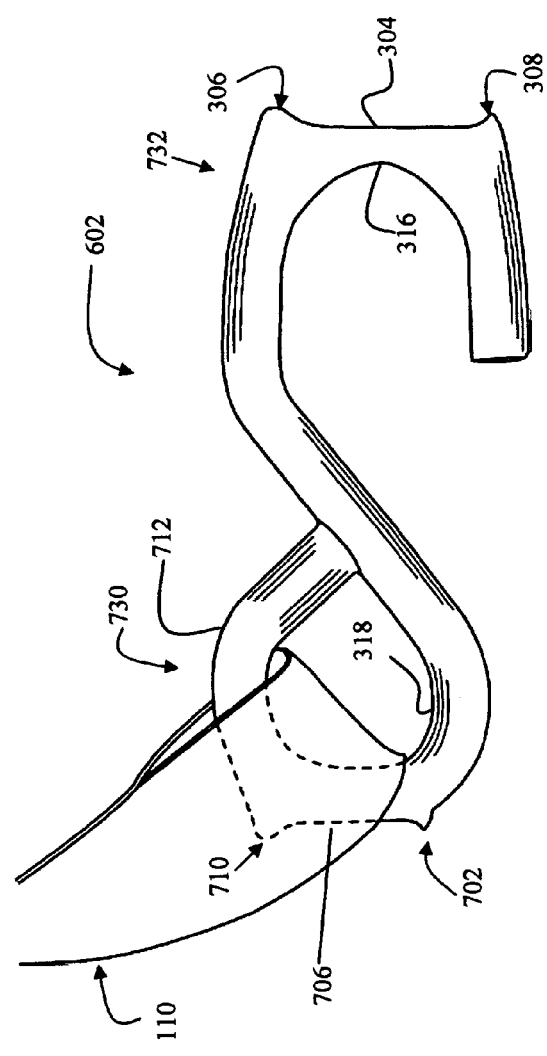
FIG. 6
FIG. 7

FASTENER WITH SELF-ORGANIZING DEVICE FOR STORAGE

BACKGROUND OF THE INVENTION (1) Field of the Invention

The present invention is directed to fasteners and, more particularly, to tie-down strap fasteners with self-organizing device for easy storage of the fastener after use.

(2) Description of Related Art

Conventional tie-down straps are well known and have been in use for a number of years for large variety of applications. Reference is made to the exemplary U.S. Pat. Nos. 2,429,926; 2,442,266; 3,377,044; 3,927,445; 4,280,258; 4,862,563; 4,991,640; 5,008,987; Des. 319,382; 5,130,899; 5,289,619; Des. 351,336; 5,535,928; 5,548,871; 5,604,961; 5,761,774; 5,868,369; 6,049,953; 6,416,265; 6,430,784; 6,449,816; and 6,775,896. Regrettably, most prior art conventional tie-down straps suffer from obvious disadvantage in terms of storage. Conventional tie-down straps are loosely stored, resulting in a twisted and tangled strap, which must be untangled before every use.

In light of the current state of the art and the drawbacks to current fasteners mentioned above, a need exists for a fastener that would have a self-organizing device, and that would be simple, practical, and easy to use for storage and re-use.

BRIEF SUMMARY OF THE INVENTION

One aspect of the present invention provides a tie-down strap, comprising:
  a first webbing having a first end comprised of a loop, and a second end coupled to a first hook;
  a first strip that is comprised of miniature clasps is coupled with an exterior of the loop along a first side of the first webbing;
  a second strip that is comprised of miniature hooks is coupled along a second side of the first webbing, proximal an end of the loop;
  a strap stopper is coupled with the first side of the first webbing, proximal the second end of the first webbing, having a width substantially commensurate with a width of the first webbing, and having sufficient thickness for preventing further sliding of the first webbing through a self-locking buckle, and used for aligning a first distal end of the first hook and a second distal end of a second hook for storage;
  the self-locking buckle slidably engaged on the first webbing between the first and the second ends thereof and having an automatic locking mechanism for locking the first webbing in positions to which the first webbing is adjusted lengthwise of the first webbing;
  the self-locking buckle is comprised of elongated walls providing a strap guiding channel therebetween, and providing housing for storage of the first webbing when the first webbing is wrapped around the self-locking buckle, thereby entirely housing the first webbing;
  a second webbing having a third end coupled to an end of the self-locking buckle, and having a fourth end coupled to the second hook; and
  the first distal end of the first hook and the second distal end of the second hook, comprising an exterior with a flattened section for enabling the first webbing to rest thereon while in closed position.

One optional aspect of the present invention provides a tie-down strap, wherein:
  the first distal end of the first hook and the second distal end of the second hook are further comprised of two protrusions at a lateral ends thereof, preventing slippage of the first webbing.

Another optional aspect of the present invention provides a tie-down strap, wherein:
  the first hook is comprised of a first proximal end and the second hook is comprised of a second proximal end, with the first proximal end of the first hook and the second proximal end of the second hook comprising an exterior with a flattened section for enabling the first webbing to rest thereon while in closed position.

Yet another optional aspect of the present invention provides a tie-down strap, wherein:
  the first proximal end of the first hook and the second proximal end of the second hook are further comprised of two protrusions at a lateral ends thereof, preventing slippage of the first webbing.

A further optional aspect of the present invention provides a tie-down strap, wherein:
  a second strap stopper that is coupled with the second side of the first webbing, proximal an end of the second strip.

Still a further optional aspect of the present invention provides a tie-down strap, wherein:
  the size of the loop is of sufficient dimensions to enable a use of at least one hand to grasp and hold for pulling the first webbing for creating tension.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character(s) present corresponding parts throughout:

FIG. 6 is an exemplary side view illustration of an alternative embodiment for a tie-down strap with self-organizing device with in accordance with the present invention;

FIG. 7 is an exemplary side view illustration of an alternative embodiment for a hook device used with the tie-down strap illustrated in FIG. 6 in accordance with the present invention.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

Figure 1:
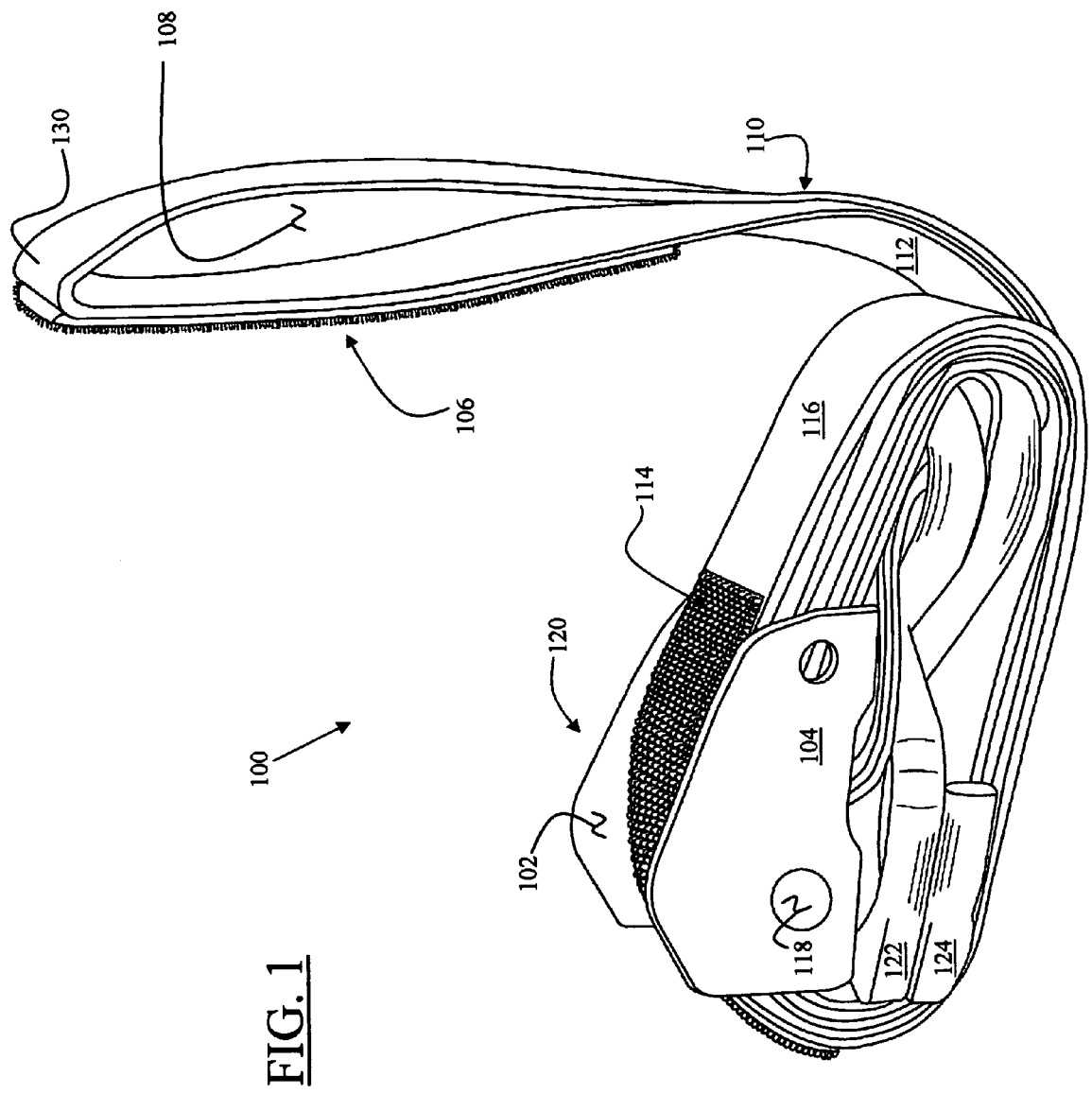
FIG. 1 is an exemplary perspective view illustration of a tie-down strap with self-organizing device in accordance with the present invention.

The present invention provides a tie-down strap that may be used more or less universally for securing cargo of various kinds under different varying conditions, and further includes a self-organizing device that is simple, practical, and easy to use for storage and re-use of the tie-down strap. FIG. 1 is an exemplary perspective view illustration of a tie-down strap with self-storage device in accordance with the present invention, and FIG. 2 is an exemplary side view illustration of the tie-down strap illustrated in FIG. 1, in a closed position.

Figure 2:
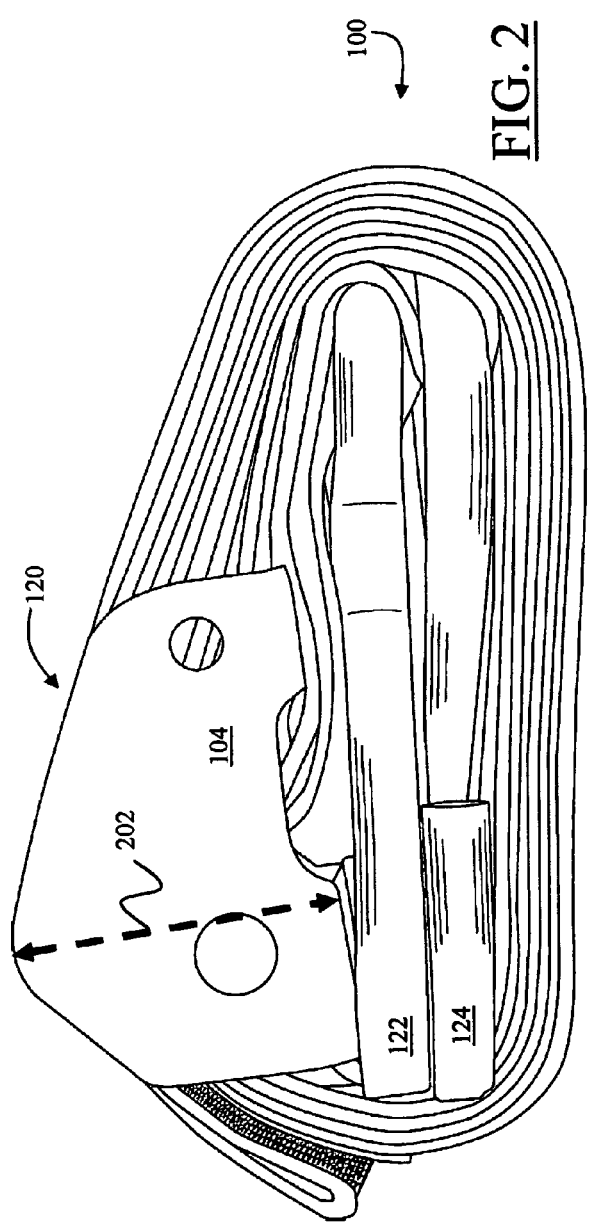
FIG. 2 is an exemplary side view illustration of the tie-down strap illustrated in FIG. 1, in a closed position in accordance with the present invention.

As illustrated in FIGS. 1 and 2, the tie-down strap 100 of the present invention is comprised of a self-organizing device having a first strip or tape of soft fabric 106 that is comprised of miniature clasps coupled along a first side 112 of a first longer webbing 110 of the tie-down strap 100. The self-organizing device further includes a second, complementary strip or tape fabric 114 that is comprised of miniature hooks coupled along a second side 116 of the first longer webbing 110. The strip pair 106 and 114 is generally known by the brand name Velcro®, which is generally made of nylon fabric. To close and store the tie-down strap 100, the first longer webbing 110 is simply wrapped around a self-locking buckle unit 120, and the Velcro® pair 106 and 114 are aligned facing each other, and then pressed against one another. The clasps of the first tape 106 are intertwined or interlocked with the hooks of the second tape 114 to maintain the webbing 110 in a closed arrangement as is illustrated in FIG. 2, housed within the self-locking buckle 120. Accordingly, the tie-down strap 100 of the present invention with the self-organizing device is simple, practical, and easy to use for storage and re-use.

As illustrated in FIGS. 1 to 5, the tie-down strap 100 is comprised of a first longer webbing 110 with a first end 130 having a tightening loop 108, and a second end 362 having a first fastening loop 560 coupled with a first hook 122, with the body of the webbing 110 passed through the self-locking buckle 120. The tightening loop 108 is used for pulling the webbing 110 to tighten the tie-down strap 100 around a cargo (not shown) for securing the cargo. Stated otherwise, the tightening loop 108 provides a mechanism to apply more tension and to take out any looseness on the webbing 110 for better securing of the cargo.

Included on the exterior of the tightening loop 108 is the first Velcro® strip or tape 106, which is coupled along a length of the first side 112 of the first longer webbing 110. In general, the Velcro® tape 106 is soft, and is therefore gentler to touch against the skin of the user during use (when the tightening loop 108 is grabbed for pulling the webbing 110 to provide tension to the webbing 110 for securing a cargo). As further illustrated, included on the second side 116 of the first longer webbing 110, proximal the end of the tightening loop 108 is the second Velcro® strip or tape 114, which is coupled along a length of the second side 116 of the first longer webbing 110.

Figure 3:
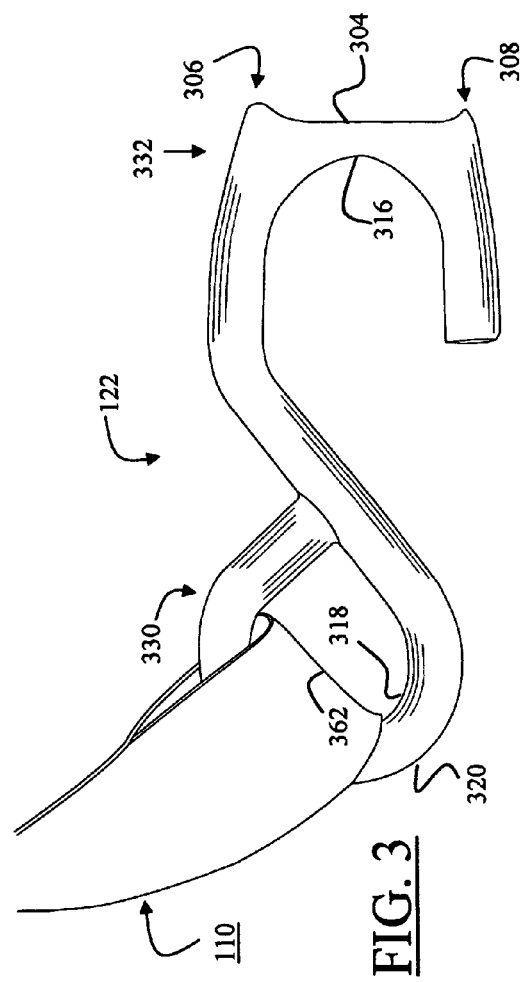
FIG. 3 is an exemplary side view illustration of a hook device used with the tie-down strap illustrated in FIG. 1 in accordance with the present invention.
Figure 4:
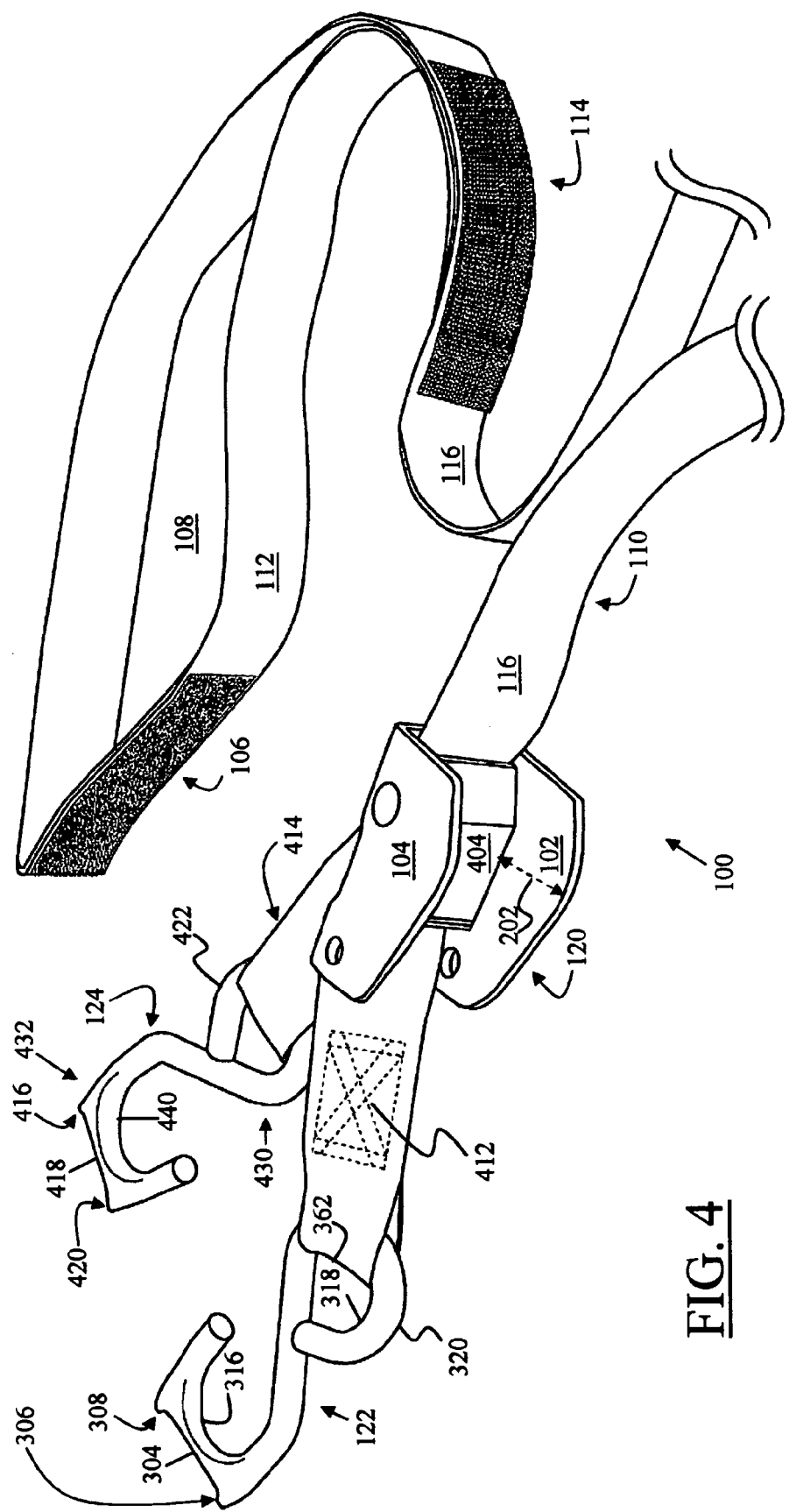
FIG. 4 is an exemplary perspective view illustration of the tie-down strap of FIG. 1 in open position in accordance with the present invention.
Figure 5:
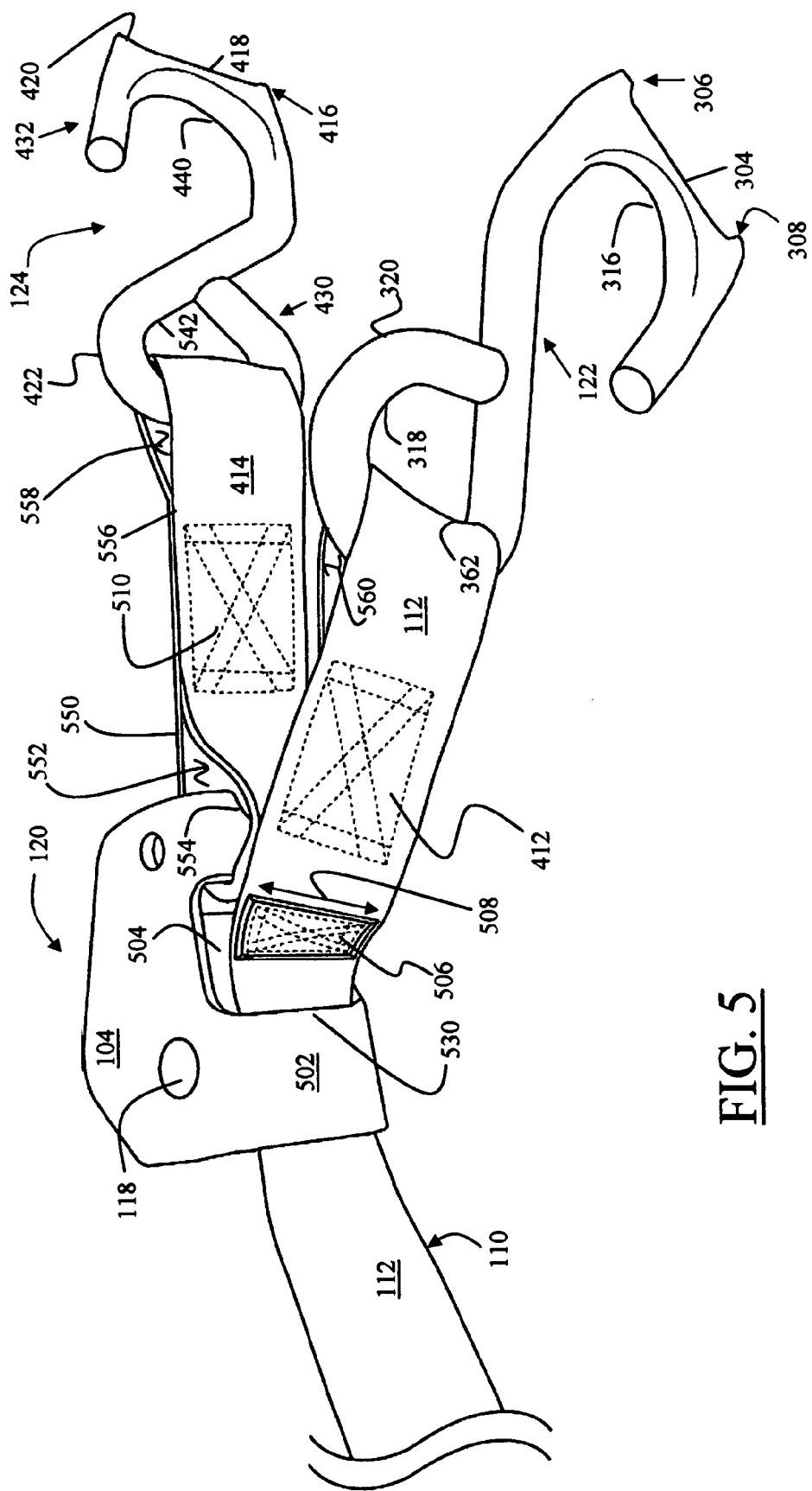
FIG. 5 is an exemplary perspective view illustration of the tie-down strap of FIG. 1, showing details of a stop mechanism.

As best illustrated in FIGS. 3, 4, and 5, the second end 362 of the webbing 110 is comprised of the first fastening loop 560, formed from stitching or sowing the second end 362 with the body of the webbing 110 at 412. The loop 560 formed includes and holds a proximal end 330 of the first hook 122. Further included proximal the second end 362 of the first webbing 110 is a strap stopper 506 that is coupled with the first side 112 of the first webbing 110. The strap stopper 506 has a width 508 substantially commensurate with a width of the first webbing 110, and further, is of sufficient thickness for preventing further sliding of the first webbing 110 through the self-locking buckle 120. That is, the strap stopper 506 has sufficient thickness that pushes against the edge 530 of the base 502 of the self-locking buckle 120 when the first webbing 110 is pulled. This way, the first webbing 110 is stopped, and is not pulled in through the opening 504 of the self-locking buckle 120. The strap stopper 506 is used for aligning a first distal end 332 of the first hook 122 and a second distal end 432 of the second hook 124 for storage of the tie-down strap. In other words, the strap stopper 506 provides a fixed length for the first webbing 110 to allow the distal end 332 of hook 122 to line up with the distal end 432 of the hook 124. Therefore, the user need only pull on the webbing 110, and because of the strap stopper 506, the distal ends of the hooks will quickly line-up for wrapping of the webbing 110 around the self-locking buckle 120 for storage of the tie-down strap 100. Without the strap stopper 506, the user must continually adjust (by trial and error) to line up the distal ends 332 and 432 of the respective hooks 122 and 124, prior to wrapping of the webbing 110 around the self-locking buckle 120. The physical location of the strap stopper 506 may vary, depending on the length of a fixed, shorter, second webbing 414.

As illustrated in FIGS. 1 to 5, further included with the tie-down strap 100 of the present invention is the self-locking buckle 120 that has a lock and release mechanism 404, which is used for length adjustment, slack take-up, and further, storage of both first longer webbing 110 and the second shorter webbing 414. As illustrated, the self-locking buckle 120 is comprised of a base plate 502 with upturned parallel walls 102 and 104 along the opposite longitudinal edges of the self-locking buckle 120. The walls 102 and 104 stiffen the plate 502, and provide bearings for a pin or stud 118 riveted or otherwise rigidly secured in the walls 102 and 104 parallel to the face of the base plate 502. A lever 404 is pivotally mounted on pin 118, a side of which is used to firmly grip the length of the webbing 110 for lock and release of the webbing 110 for length adjustment and slack take-up. The prior art version of a lock and release mechanism using a similar lever is detailed in U.S. Pat. No. 2,442,266 to Frank L. Davis. The entire disclosure of U.S. Pat. No. 2,442,266 is expressly incorporated by reference herein. However, to accommodate for the added functionality of storing of the tie-down strap 100, the self-locking buckle 120 of the present invention incorporates two parallel walls 102 and 104 with increased heights, forming a housing or a guide to house the webbing 110 for storage. That is, the walls 102 and 104 are made longer, and have an increased height 202 of approximately one-(1) inch at a minimum, functioning as strap guiding channel to entirely house the webbing 110 when wrapped around the buckle 120, and further, keeping the webbing 110 from slipping out.

The second shorter webbing 414 is comprised of a first end 550 that is looped 552 and is coupled to the first end 554 of the self-locking buckle 120. The second shorter webbing 414 is further comprised of a second end 556 that is also looped 558 and is coupled with the proximal end 430 of the second hook 124. The ends of the loops 552 and 558 are stitched or sown together at 510.

As further illustrated, the tie-down strap 100 is further comprised of the first hook 122 and the second hook 124, which are identical. Each of the respective first and second hooks 122 and 124 have a respective proximal end 330 and 430 that is coupled to the respective webbings 110 and 414, and a respective distal end 332 and 432, which is free and is used to anchor onto some fixture. The proximal ends 330 and 430 of the respective first and second hooks 122 and 124 have a respective interior 318 and 542, and exterior 320 and 422 that are smooth and curved.

The interior 316 and 440 of each respective distal end 332 and 432 of the first and second hooks 122 and 124 is smooth and curved, but the respective exterior thereof has a flattened section 304 and 418. The flattened sections 304 and 418 are sufficiently wide to enable the entire width of the webbing 110 to wrap or enfold, and rest thereon. The flattened sections 304 and 418 enable the webbing 110 to securely wrap or enfold, and rest against the exterior distal ends 332 and 432, as illustrated in FIGS. 1 and 2. As further illustrated in FIGS. 3 to 5, the exterior distal end 332 and 432 of the respective hooks 122 and 124 further include respective pairs of protrusions 306 and 308, and 416 and 420. The combination of the flattened sections 304 and 418 with the respective pairs of protrusions 306 and 308, and 416 and 420 form a "U" shaped configuration, which functions as a channel or a guide that securely houses the webbing 110 along its longitudinal groove for preventing the webbing 110 from slipping to become loose when stored. The height of the protrusions 306 and 308, and 416 and 420 may vary based on the thickness of the webbing being stored.

FIG. 6 is an exemplary side view illustration of an alternative embodiment for a tie-down strap 600 with self-organizing device using hooks 602 and 604 with similar exterior proximal and distal ends in accordance with the present invention, and FIG. 7 is an exemplary side view illustration thereof. The tie-down strap 600 includes the same corresponding or equivalent components as the tie-down strap 100 that is shown in FIGS. 1 to 5, and described above. Therefore, for the sake of brevity, clarity, and convenience the general description of FIGS. 6 and 7 will not repeat every corresponding or equivalent component that has already been described above in relation to the tie-down strap 100 that is shown in FIGS. 1 to 5.

As illustrated in both FIG. 6 and FIG. 7, the tie-down strap 600 is comprised of a first hooks 602 and a second hook 604, which are identical. Therefore, for the sake of brevity, clarity, and convenience FIG. 7 has been provided as an exemplary representation of only one of the hooks (602 and 604) in detail. Each of the hooks 602 and 604 have a respective proximal ends 730 that are coupled to the respective webbings 110 and 414, and a respective distal end 732, which are free and anchor onto some fixture. The proximal ends 730 of the respective hooks 602 and 604 have a respective interior 318 that are smooth and curved, with an exterior 712 that has identical configuration to that of the exterior distal end 732. That is, the exterior 712 of the proximal ends 730 of the hooks 602 and 604 are rounded near the mid section of the hook, but have a flattened section 706 at an exterior, proximal end 730. The flattened sections 706 are sufficiently wide to hold the entire width of the first webbing 110. The flattened sections 706 enable the first webbing 110 to securely rest against the exterior proximal ends 712, as illustrated in FIGS. 6 and 7. As further illustrated in FIG. 7, the exterior proximal ends 712 of the respective hooks 602 and 604 further include respective pairs of protrusions 702 and 710. The combination of the flattened sections 706 with the respective pairs of protrusions 702 and 710 form a "U" shaped configuration, which functions as a channel or a guide that securely houses the first webbing 110 along its longitudinal groove, and prevents the first webbing 110 from slipping to become loose when stored. The height of the protrusions 702 and 710 may vary based on the thickness of the webbing being stored.

Figure 8:
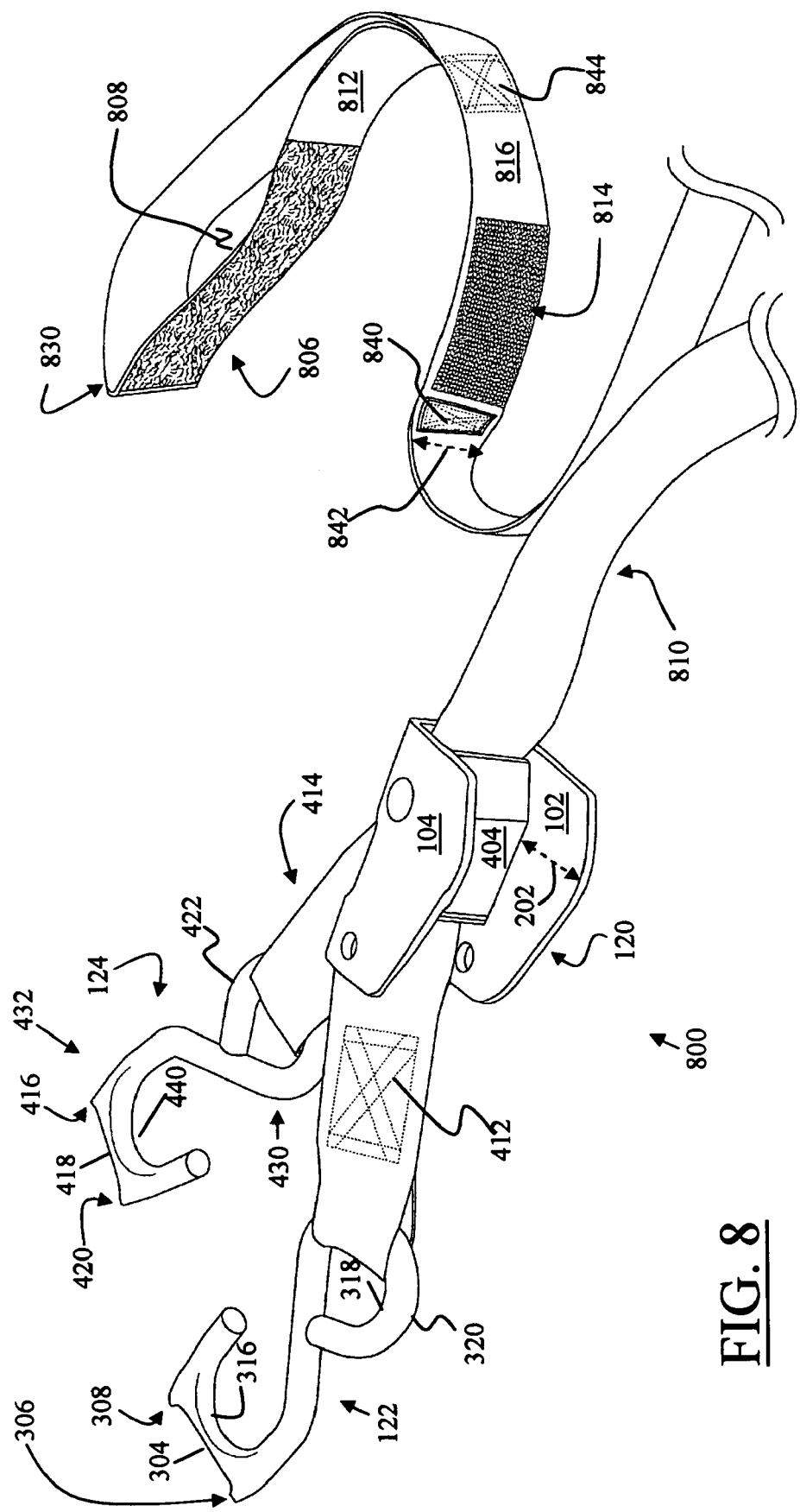
FIG. 8 is an exemplary perspective view illustration of another alternative embodiment for a tie-down strap with self-organizing device having shorter diameter loop, and an extra strap stopper in accordance with the present invention.

FIG. 8 is an exemplary perspective view illustration of an alternative embodiment for a tie-down strap 800 with self-organizing device having a shorter tightening loop. The tie-down strap 800 includes the same corresponding or equivalent components as the tie-down strap 100 that is shown in FIGS. 1 to 5, and described above. Therefore, for the sake of brevity, clarity, and convenience the general description of FIG. 8 will not repeat every corresponding or equivalent component that has already been described above in relation to the tie-down strap 100 that is shown in FIGS. 1 to 5.

As illustrated in FIG. 8, the tie-down strap 800 of the present invention is comprised of a self-organizing device having a first strip or tape of soft fabric 806 that is comprised of miniature clasps coupled along a first side 812 of a first longer webbing 810 of the tie-down strap 800. The self-organizing device further includes a second, complementary strip or tape fabric 814 that is comprised of miniature hooks coupled along a second side 816 of the first longer webbing 810. The strip pair 806 and 814 is generally known by the brand name Velcro®, which is generally made of nylon fabric. To close and store the tie-down strap 800, the first longer webbing 810 is simply wrapped around a self-locking buckle unit 120, and the Velcro® pair 806 and 814 are aligned facing each other, and then pressed against one another. The clasps of the first tape 806 are intertwined or interlocked with the hooks of the second tape 814 to maintain the webbing 810 in a closed arrangement, housed within the self-locking buckle 120. Accordingly, the tie-down strap 800 of the present invention with the self-organizing device is simple, practical, and easy to use for storage and re-use.

As further illustrated, the tie-down strap 800 is comprised of a first longer webbing 810 with a first end 830 having a tightening loop 808, and a second end having a first fastening loop 560 coupled with a first hook 122, with the body of the webbing 810 passed through the self-locking buckle 120. The tightening loop 808 has a substantially smaller diameter than that of tie-down strap 100, and is also used for pulling the webbing 810 to tighten the tie-down strap 800 around a cargo (not shown) for securing the cargo.

Included on the exterior of the tightening loop 808 is the first Velcro® strip or tape 806, which is coupled along a length of the first side 812 of the first longer webbing 810. In general, the Velcro® tape 806 is soft, and is therefore gentler to touch against the skin of the user during use (when the tightening loop 808 is grabbed for pulling the webbing 810 to provide tension to the webbing 810 for securing a cargo). As further illustrated, included on the second side 816 of the first longer webbing 810, proximal the end of the tightening loop 808, passed the stitching 844, is the second Velcro® strip or tape 814, which is coupled along a length of the second side 816 of the first longer webbing 810.

Further included with the tie-down strap 800 is a strap stopper 840 that is coupled with the first side 812 of the first webbing 810. The strap stopper 840 has a width 842 substantially commensurate with a width of the first webbing 810, and further is of sufficient thickness for preventing further sliding of the first webbing 810 through a self-locking buckle 120. That is, the strap stopper 840 has sufficient thickness that pushes against the edge 530 of the base 502 of the self-locking buckle 120 when the first webbing 810 is pulled. This way, the first webbing 810 is stopped, and is not pulled in through the opening 504 of the self-locking buckle 120.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. For example, the various dimensions of the components may be proportionately varied. In particular, a longer strap would preferably require a self-locking buckle with walls that are of longer height to accommodate for larger radii of strap when wrapped about the self-locking buckle. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, proximal, distal, etc. have been used for convenience purposes only and are not intended to imply any particular fixed direction or orientation. Instead, they are used to reflect relative locations and/or directions/orientations between various portions of an object. In addition, reference to "first," "second," "third," and etc. members throughout the disclosure (and in particular, claims) is not used to show a serial or numerical limitation but instead is used to distinguish or identify the various members of a group.

What is claimed is:

1. A tie-down strap, comprising:
   a first webbing having a first end comprised of a loop, and a second end coupled to a first hook;
   a first strip that is comprised of miniature clasps is coupled with an exterior of the loop along a first side of the first webbing;
   a second strip that is comprised of miniature hooks is coupled along a second side of the first webbing, proximal an end of the loop;
   a strap stopper is coupled with the first side of the first webbing, proximal the second end of the first webbing, having a width substantially commensurate with a width of the first webbing, and having sufficient thickness for preventing further sliding of the first webbing through a self-locking buckle, and used for aligning a first distal end of the first hook and a second distal end of a second hook for storage;
   the self-locking buckle slidably engaged on the first webbing between the first and the second ends thereof and having an automatic locking mechanism for locking the first webbing in positions to which the first webbing is adjusted lengthwise of the first webbing;
   the self-locking buckle is comprised of elongated walls providing a strap guiding channel therebetween, and providing housing for storage of the first webbing when the first webbing is wrapped around the self-locking buckle, thereby entirely housing the first webbing;
   a second webbing having a third end coupled to an end of the self-locking buckle, and having a fourth end coupled to the second hook; and
   the first distal end of the first hook and the second distal end of the second hook, comprising an exterior with a flattened section for enabling the first webbing to rest thereon while in closed position.

2. A tie-down strap as forth in claim 1, wherein:
   the first distal end of the first hook and the second distal end of the second hook are further comprised of two protrusions at a lateral ends thereof, preventing slippage of the first webbing.

3. A tie-down strap as set forth in claim 1, wherein:
   the first hook is comprised of a first proximal end and the second hook is comprised of a second proximal end, with the first proximal end of the first hook and the second proximal end of the second hook comprising an exterior with a flattened section for enabling the first webbing to rest thereon while in closed position.

4. A tie-down strap as set forth in claim 3, wherein:
   the first proximal end of the first hook and the second proximal end of the second hook are further comprised of two protrusions at a lateral ends thereof, preventing slippage of the first webbing.

5. A tie-down strap as set forth in claim 1, wherein:
   a second strap stopper that is coupled with the second side of the first webbing, proximal an end of the second strip.

6. A tie-down strap as set forth in claim 1, wherein:
   the size of the loop is of sufficient dimensions to enable a use of both hands to grasp and hold for pulling the first webbing for creating tension.

* * * * *